(12) United States Patent
Yoshinari et al.

(10) Patent No.: US 6,576,319 B2
(45) Date of Patent: Jun. 10, 2003

(54) OPTICAL INFORMATION MEDIUM AND MAKING METHOD

(75) Inventors: Jiro Yoshinari, Chuo-ku (JP); Takuya Tsukagoshi, Chuo-ku (JP); Tsuyoshi Komaki, Chuo-ku (JP)

(73) Assignee: TDK Corporation, Tokyo (JP)

( * ) Notice: Subject to any disclaimer, the term of this patent is extended or adjusted under 35 U.S.C. 154(b) by 60 days.

(21) Appl. No.: 09/875,975

(22) Filed: Jun. 8, 2001

(65) Prior Publication Data
US 2001/0053118 A1 Dec. 20, 2001

(30) Foreign Application Priority Data

| Jun. 9, 2000 | (JP) | ............................ | 2000-174543 |
| Aug. 1, 2000 | (JP) | ............................ | 2000-233783 |

(51) Int. Cl.⁷ .............................................. B32B 3/02
(52) U.S. Cl. ................ 428/64.1; 428/64.4; 430/270.11; 369/275.1
(58) Field of Search ............................ 428/64.1, 64.4, 428/913; 430/270.11, 495.1, 945; 369/275.1, 283

(56) References Cited

U.S. PATENT DOCUMENTS

| 5,827,593 | A | * | 10/1998 | Maruyama | ............... | 428/64.1 |
| 2001/0053121 | A1 | * | 12/2001 | Komaki | ............... | 369/283 |
| 2002/0114264 | A1 | * | 8/2002 | Kuchman | ............... | 369/275.3 |

FOREIGN PATENT DOCUMENTS

| JP | 8-255374 | 10/1996 |
| JP | 9-198709 | 7/1997 |
| JP | 10-222856 | 8/1998 |
| JP | 10-249264 | 9/1998 |
| JP | 10-289489 | 10/1998 |
| JP | 10-320850 | 12/1998 |
| JP | 11-195250 | 7/1999 |
| JP | 11-195251 | 7/1999 |

OTHER PUBLICATIONS

Takuo Tanaka, et al., "Three–dimensional Multi–layered Optical Memory with Laser Scanning Microscope Technology", Symposium on Optical Memory 1994—Higher Density Optical Recording Technologies and Their Application—, Jul. 11–13, 1994, International Conference Center Waseda Univ., Tokyo, Japan, p. 19.

(List continued on next page.)

*Primary Examiner*—Elizabeth Mulvaney
(74) *Attorney, Agent, or Firm*—Oblon, Spivak, McClelland, Maier & Neustadt, P.C.

(57) ABSTRACT

In the multi-layer information medium having a plurality of information-storing layers according to the present invention, all of the information-storing layers exhibits excellent reading properties. The multi-layer information medium also exhibits good mechanical precision. The optical information medium has at least two annular information-storing layers each storing recorded information and/or servo information on a disk-shaped substrate formed with a center hole or between a pair of disk-shaped substrates each formed with a center hole, and at least one of the information-storing layers is recorded or read by the recording beam or the reading beam which has passed through other information-storing layer(s). The medium has at least two annular resin layers each having an annular raised rim at its inner periphery, and the annular resin layers are formed such that their inner peripheries are in the form of steps and the annular raised rim of the resin layer is prevented from being covered by the inner periphery of the overlying resin layer.

6 Claims, 8 Drawing Sheets

OTHER PUBLICATIONS

U.S. patent application Ser. No. 09/875,139, filed Jun. 7, 2001, pending.
U.S. patent application Ser. No. 09/875,975, filed Jun. 8, 2001, pending.
U.S. patent application Ser. No. 09/875,974, filed Jun. 8, 2001, pending.
U.S. patent application Ser. No. 09/875,976, filed Jun. 8, 2001, pending.
U.S. patent application Ser. No. 09/917,902, filed Jul. 31, 2001, pending.
U.S. patent application Ser. No. 09/917,659, filed Jul. 31, 2001, pending.

* cited by examiner

RECORDING/RADING BEAM

RECORDING/READING BEAM

OPTICAL INFORMATION MEDIUM AND MAKING METHOD

BACKGROUND OF THE INVENTION

1. Field of the Invention

This invention relates to a multi-layer information medium which has at least two information-storing layers such as recording layer, and a method for making such medium.

2. Prior Art

There is a growing need for an optical disk having a higher density and a higher capacity. DVD (Digital Versatile Disk) is already commercially available, and the DVD has a storage capacity of about 4.7 GB per single side which is about seven times larger than the compact disk. Technologies enabling further increase in the amount of information recorded have been actively developed.

Technologies that have been used for increasing the recording capacity of an optical disk include use of a recording/reading beam having a shorter wavelength, use of an objective lens having a higher NA (numerical aperture) in the optical system irradiating the recording/reading beam, increase in the number of recording layers, and multi-value recording. Among these, three-dimensional recording by increasing the number of recording layers enables remarkable increase in the recording capacity at low cost compared to the use of a shorter wavelength or use of a lens with a higher NA. The three dimensional recording medium is described, for example, in Japanese Patent Application Kokai (JP-A) 198709/1997, and JP-A 255374/1996 discloses a medium wherein a rewritable information storage layer and a read only information storage layer are laminated.

In a multi-layer recording medium, a transparent resin layer which is transparent to the recording/reading beam is generally provided between adjacent recording layers, and the recording/reading beam reaches the recording layer after passing through the transparent resin layer and returns to the optical pick up after being reflected at the surface of the recording layer. Accordingly, the transparent resin layer is required to exhibit strictly uniform thickness, quality, and optical properties. When the medium has a disk shape and the transparent layer comprises a resin, the transparent layer is generally formed by spin coating since the spin coating is a process which is capable of forming a relatively uniform transparent layer. The transparent layer formed by the spin coating, however, suffers from the problem that the layer is thicker in the outer peripheral region of the disk compared to the inner peripheral region. In other words, the layer suffers from the problem of inconsistent thickness in the radial direction of the disk. The number of the transparent layers increase with the number of the recording layers, and such thickness inconsistency is accumulated with the increase in the number of the data layers. As a consequence, even if the recording/reading beam entered the medium in the outer peripheral region of the disk at normal direction, the data beam reflected at the surface of the recording layer will not be normal to the medium surface, and the quantity of the light returning to the optical pickup will be reduced. The medium will then exhibit different outputs in the inner peripheral region and in the outer peripheral region.

In the case of a joined optical recording disk wherein the recording layer has been sandwiched between two substrates, increase in the thickness of the transparent resin layer in its peripheral region is likely to result in the warping or distortion of the optical disk. Improvement in the mechanical precision would be then difficult.

In the reading of a multi-layer recording medium including a plurality of recording layers by using an optical pickup which emits a reading beam, the optical pickup receives the beam reflected from the recording layer on which the reading beam had focused, and in addition, the beam reflected from the recording layer(s) other than the recording layer to which the reading beam had focused. This results in the signal interference between the plurality of recording layers, and cross talk is induced. As a consequence, noise is introduced in the signal that has been read. The influence of the beam reflected from the recording layer other than the target recording layer reduces inversely with the square of the distance between the recording layers. Therefore, increase in the distance between the adjacent recording layers is effective in reducing the noise induced. For example, when the medium is used with an optical pickup having the structure normally employed in DVD and other conventional optical disks, the recording layers are disposed at a mutual distance of at least 30 $\mu$m, and preferably at least 70 $\mu$m to realize the signal quality of practically acceptable level. This corresponds to the Examples of the JP-A 198709/1997 wherein a transparent resin layer of 100 $\mu$m thick is provided between the recording layers, and the JP-A 255374/1996 wherein two adjacent information storage layers are disposed at a distance of 30 $\mu$m or more.

However, when the distance between the adjacent recording layers is increased to as large as 30 $\mu$m or more, limitation in the number of recording layers in the medium will be required to avoid excessive increase in the disk thickness, and the total storage capacity of the disk will also be limited. In addition, formation of a transparent resin layer with a consistent thickness of 30 $\mu$m or more is difficult. The thick resin layer also suffers from increased internal stress and the medium will be subject to warping. As a consequence, reliable provision with the optical disk of the required mechanical precision has been difficult.

In view of such situation, JP-A 222856/1998 and SOM '94 technical digest (1994) 19, for example, propose use of an optical pickup provided with a confocal optical system which utilizes the principle of a confocal microscope for the reading of each recording layer in order to reduce the cross talk between the recording layers of the multi-layer recording medium. In the case of an optical pickup provided with a confocal optical system, a pinhole is provided in the optical system and the reading is accomplished by using the beam that had passed thorough this pinhole. Accordingly, when an optical pickup provided with a confocal optical system is used, the range of the focus servo is reduced, and a higher thickness consistency is required for the transparent resin layer.

A multi-layer recording medium also suffers from the problem as described below. In the case of the medium having a single recording layer formed on a substrate, the shape of the grooves (guide grooves) formed in the resin substrate will be transferred to the recording layer. In contrast, in the case of a medium wherein two or more recording layers are formed on the substrate with an intervening relatively thick transparent layer between the recording layers, it is quite difficult to transfer the shape of the grooves formed in the substrate to all of the recording layers since the groove depth is about 100 nm at most for optical reasons while the distance between the recording layers is at least 30 $\mu$m as described above. As a consequence, formation of the grooves in the transparent resin layer by photopolymerization (2P) process will be required as described, for example, in the JP-A 198709/1997 and an eminent increase in the production cost is invited.

SUMMARY OF THE INVENTION

An object of the present invention is to realize excellent reading properties in all of the information-storing layers in a multi-layer information medium having a plurality of information-storing layers formed therewith. Another object of the invention is to realize good mechanical precision in the multi-layer information medium. A further object of the invention is to provide such multi-layer information medium at a low cost.

Such objects are attained by the present invention as described in (1) to (5), below.
(1) An optical information medium having at least two annular information-storing layers each storing recorded information and/or servo information on a disk-shaped substrate formed with a center hole or between a pair of disk-shaped substrates each formed with a center hole, wherein at least one of the information-storing layers is recorded or read by the recording beam or the reading beam which has passed through other information-storing layer(s), wherein
the medium has at least two annular resin layers each having an annular raised rim at its inner periphery, and the annular resin layers are formed such that their inner peripheries are in the form of steps and the annular raised rim of the resin layer is prevented from being covered by the overlying resin layer.
(2) An optical information medium according to the above (1) wherein the resin layer is disposed between adjacent information-storing layers each storing the recorded information, and the resin layer has a thickness of 5 μm to less than 30 μm.
(3) An optical information medium according to the above (1) or (2) wherein said information-storing layer is read by using a confocal optical system.
(4) An optical information medium according to any one of the above (1) to (3) wherein the information-storing layer comprises a data layer storing the recorded information and a servo layer storing servo information which are independently formed from each other.
(5) A method for producing the optical information medium according to any one of the above (1) to (4) wherein the method comprises the consecutive steps of:
placing the substrate on a turntable and covering the center hole of the substrate by a plug means having a disk member, supplying a coating solution containing the resin onto the disk member, and rotating the substrate with its center hole covered by the plug means to thereby spread the coating solution over the substrate and form the resin layer;
removing the disk member from the substrate to leave the annular resin layer having an annular raised rim formed at its inner periphery; and
curing the resin layer.

DETAILED DESCRIPTION OF THE INVENTION

The information medium to which the present invention is applied has a structure comprising at least two information-storing layers. The term "information-storing layer" used herein includes both the data layer and the servo layer. A "data layer" is the layer wherein record marks and pits carrying the recorded information are present, and "a servo layer" is the layer formed with a tracking servo pattern comprising projections and depressions such as grooves and pits. When the servo layer is not provided independently from the data layer, tracking servo pattern may be formed on the data layer.

In the present invention, the beam used in the reading of the data layer and the recording of the data layer is designated the "data beam" and the beam used in the reading of the servo layer is designated the "servo beam". The "recording/reading beam" of the present invention is a concept including the data beam and the servo beam.

The "multi-layer information medium" of the present invention is a medium comprising a plurality of information-storing layers, and which includes an information-storing layer whose recording and/or reading is accomplished by the recording/reading beam which has passed through other information-storing layer(s).

The "optical information medium" of the present invention includes both an optical recording medium and a read only medium. In the case of an optical recording medium, the data layer includes a recording layer. In the case of a read only medium, data-storing pits or record marks are preliminarily formed in the data layer.

Figure 1:
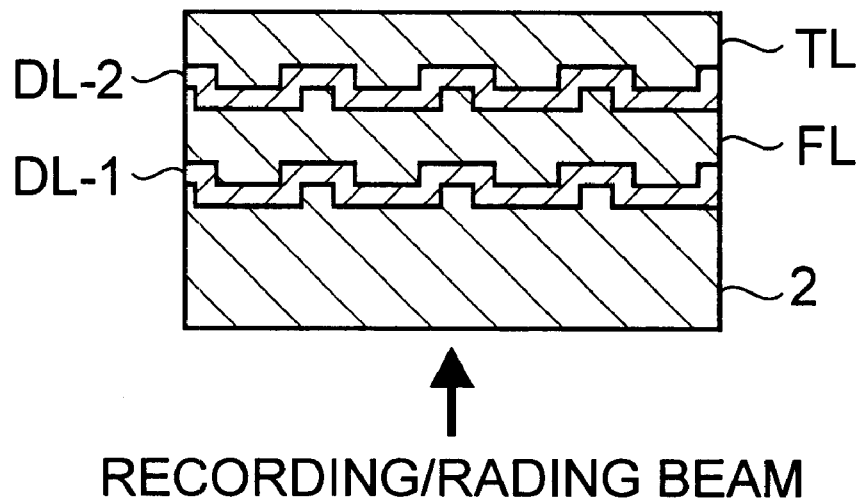
FIG. 1 is a partial cross-sectional view of the optical information medium according to an embodiment of the present invention.

FIG. 1 shows an embodiment of the multi-layer medium of the present invention in its cross section. The medium of FIG. 1 comprises a substrate 2 formed with tracking grooves, two data layers DL-1 and DL-2 disposed on the substrate 2, a filter layer FL between the two data layers, and a transparent layer TL on the data layer DL-2. The transparent layer TL functions as a protective layer. In this medium, the data layers DL-1 and DL-2 are respectively read by introducing two reading beams each having different wavelength from the bottom side of the medium in the drawing and detecting the reflected beam by the optical pickup. When the medium is an optical recording medium, the recording beam and the reading beam are generally emitted from the same optical pickup, and the recording and the reading beams generally have the same wavelength.

[0017]

The filter layer FL of the medium of the present invention shown in FIG. 1 exhibits an absorption for the data beam used for reading the lower data layer DL-1 which is higher than the absorption for the data beam used for reading the upper data layer DL-2. As a consequence, in the reading of the data layer DL-1, intensity of the reading beam reaching the data layer DL-2 is reduced and the influence of the beam reflected from the data layer DL-2 would be suppressed. In contrast, in the reading of the data layer DL-2, the data beam is not so much absorbed by the filter layer FL and the reading is not obstructed. This enables provision of the data layer DL-1 and data layer DL-2 in close proximity to each other with reduced cross talk being induced between these data layers. In contrast, if a transparent layer highly transparent to the recording/reading beam were formed instead of the filter layer FL, the optical pickup will pick the beam reflected from the upper data layer DL-2 while the lower data layer DL-1 is read by focusing at the lower data layer DL-1, and this will result in a reading noise unless the thickness of the transparent layer were fully increased.

As a matter of fact, in the reading of the upper data layer DL-2, the influence of the beam reflected from the lower data layer DL-1 is inescapable. The cross talk influence, however, will be reduced when the recording density is low, and the medium of the embodiment of FIG. 1 is preferably designed such that the recording density of the DL-2 is lower than that of the DL-1. In such a case, a beam with a longer wavelength is generally used as the data beam for recording/reading of the DL-2 compared to the data beam used for the recording/reading of the DL-1.

Figure 2:
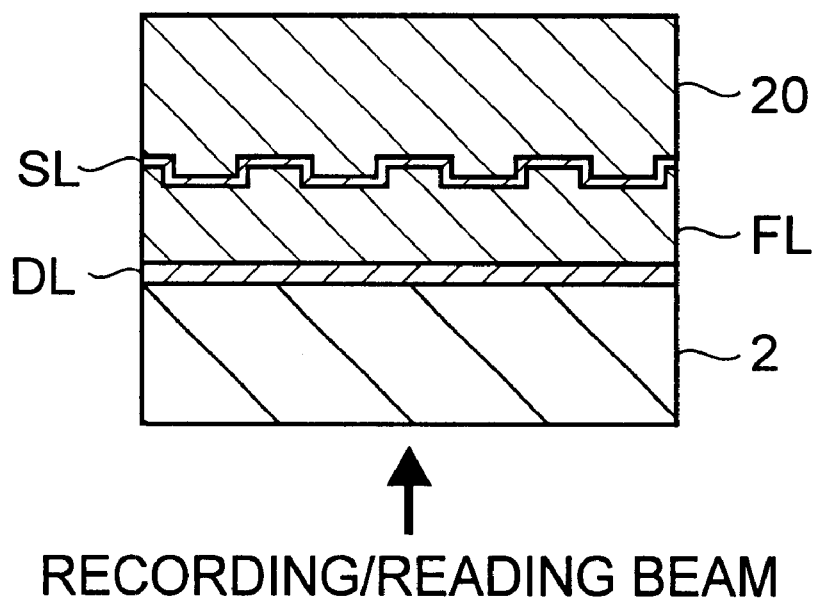
FIG. 2 is a partial cross-sectional view of the optical information medium according to an embodiment of the present invention.

FIG. 2 shows the medium according to another embodiment of the present invention. The medium shown in FIG. 2 comprises a substrate 2, one data layer DL on the substrate 2, a filter layer FL on the data layer DL, and a servo substrate 20 on the filter layer FL. The servo substrate 20 is formed with a tracking servo pattern comprising grooves and/or pits, and on the surface on the side of the recording/reading beam incidence of this servo substrate 20 is formed a reflective layer which functions as the servo layer SL.

In the reading of the medium shown in FIG. 2, a beam having a wavelength different from the data beam used in reading the data layer DL is used for the servo beam used in reading the servo layer SL. The filter layer FL of this medium has an absorption for the data beam higher than the absorption for the servo beam, and in the reading of the data layer DL, there is less likeliness for contamination of the reading noise induced by the data beam reflected from the servo layer SL.

The reading of the servo information such as tracking servo information is less likely to be influenced by the noise compared to the reading of the data layer, and in the embodiment shown in FIG. 2, reading of the data layer recorded at a high recording density at low noise is realized simultaneously with high precision servo. In addition, since the servo layer is independently formed in the embodiment of FIG. 2, formation of the data layer as a smooth layer is enabled. As a consequence, the reflectivity of the data layer DL is increased, and no interference is induced by the steps of the tracking servo pattern. Generation of the noise due to irregularity such as deformation of the tracking servo pattern such as winding of the groove is also avoided. In the embodiment of FIG. 2, a beam with a shorter wavelength is generally used for the data beam compared to the servo beam.

Figure 4:
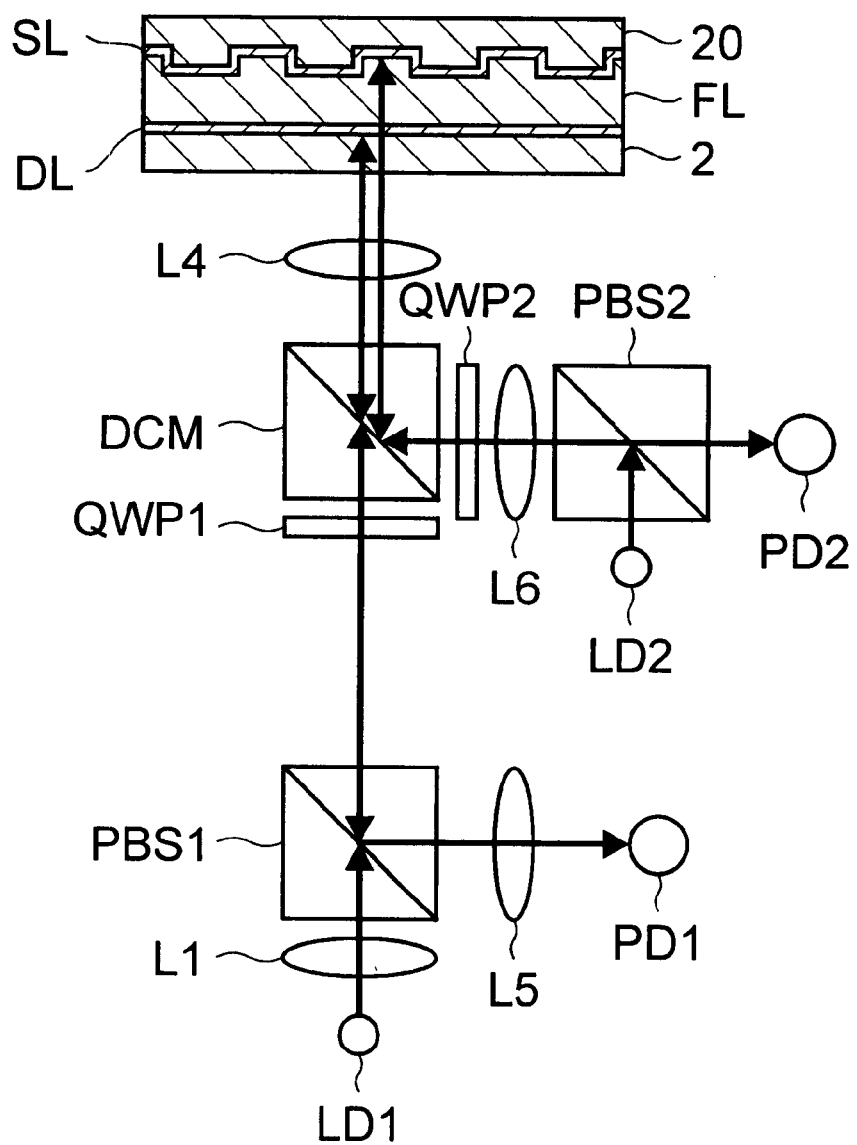
FIG. 4 is a view showing an embodiment of the optical pickup used for recording and reading of the optical information medium according to the present invention.

FIG. 4 shows an embodiment of the optical pickup which can be used in the recording and reading of the multi-layer information medium of the present invention together with the medium having the structure of FIG. 2.

In this optical pickup, the data beam is emitted from a laser diode LD1. The data beam then goes through a lens L1 to become collimated, and after going through a polarizing beam splitter PBS 1, the beam passes through quarter-wave plate QWP 1 and dichroic mirror DCM which is transparent to the data beam, and the beam enters objective lens L4 to be focused at the data layer DL of the multi-layer information medium. The data beam reflected by the data layer DL-1 goes back along the same pathway as the incidence into the medium, and the beam is then reflected by the polarizing beam splitter PBS 1 to be focused by a lens L5 to a photodetector PD 1. The focus servo to the data layer DL, or the focus servo and detection of the signal that has been read is thereby accomplished.

In the medium of FIG. 4, a filter layer FL is present between the data layer DL and the servo layer SL, and the data beam returning to the optical pickup after being reflected at the servo layer SL will have gone through the filter layer FL and back to become significantly attenuated. Generation of the noise in the reading of the data layer DL due to the reflection at the servo layer is thereby suppressed to a considerable degree.

In the meanwhile, the servo beam is emitted from a laser diode LD2. The beam is then reflected by a polarizing beam splitter PBS 2, and goes through a lens L6 and a quarter-wave plate QWP 2 to be reflected by a dichroic mirror DCM. The beam then enters the objective lens L4 to become focused on the servo layer SL. The servo beam is then reflected by the servo layer SL to go back along the same pathway as its incidence into the medium, and the beam passes through the polarizing beam splitter PBS 2 to be focused on a photodetector PD 2. The tracking servo and the focus servo to the servo layer are thereby accomplished.

Use of the optical pickup of such constitution, namely, the optical pickup equipped with the dichroic mirror DCM which has spectral characteristics of reflecting the servo beam while allowing the data beam to pass therethrough is advantageous when the data layer and the servo layer are separately provided and the data beam and the servo beam are simultaneously irradiated for the reading. In this way, introduction of the reflected servo beam into the photodetector D1 provided for detection of the data beam as well as introduction of the reflected data beam into the photodetector D2 provided for detection of the servo beam can be avoided.

The dichroic mirror DCM, however, is not capable of fully passing the data beam therethrough, and the data beam is partly reflected by the dichroic mirror DCM. If a transparent layer were provided instead of the filter layer FL shown in FIG. 4, the data beam would partly reach the photodetector PD 2 provided for the servo purpose to adversely affect the tracking servo. When the data beam has a high intensity as in the case of the data beam used in the recording, such adverse effect is serious. In contrast, when a filter layer FL is provided between the data layer DL and the servo layer SL, the data beam is considerably attenuated on the way and back through the filter layer FL, and the adverse effects on the tracking servo caused by the data beam is greatly suppressed.

Figure 3:
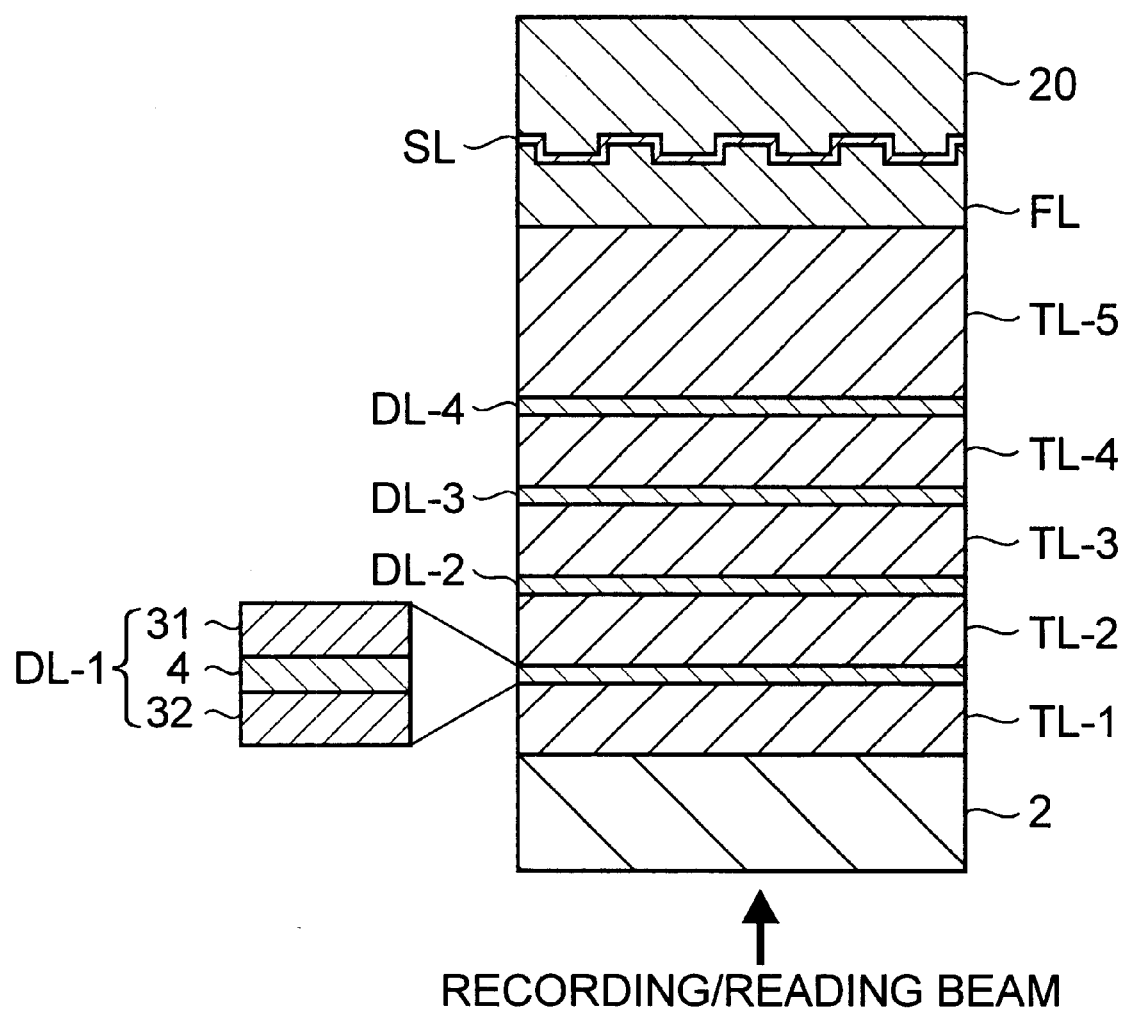
FIG. 3 is a partial cross-sectional view of the optical information medium according to another embodiment of the present invention.

FIG. 3 shows another embodiment of the multi-layer information medium according to the present invention. The medium of FIG. 3 comprises a substrate 2, five transparent layers TL-1 to TL-5 on the substrate 2, and four data layers DL-1 to DL-4 between the adjacent transparent layers. On the transparent layer TL-5 is formed a filter layer FL, a servo layer SL, and a servo substrate 20 in this order. The servo substrate 20 is formed with a tracking servo pattern comprising grooves and/or pits, and this pattern is transferred to the servo layer SL.

The medium of FIG. 3 has a constitution similar to that of FIG. 2 except for the larger number of data layers. When two or more data layer are formed, and in particular, when three or more data layers are formed, formation of the tracking servo pattern of high precision in each of the data layer at a low cost is difficult, and the structure wherein the data layers and the servo layer are independently formed is effective.

In the medium of FIG. 3, the filter layer FL is provided between the data layer DL-4 and the servo layer SL, and no filter layer is provided between adjacent data layers. Therefore, provision of the data layers at a close proximity invites increase in the cross talk. When the cross talk is to be reduced in the medium of such structure, use of an optical pickup having a confocal optical system which utilizes the principle of a confocal microscope is desirable. An optical pickup having a confocal optical system has a very high resolution in the thickness direction of the medium, and the cross talk between the data layers can be greatly reduced by the use of such optical pickup. Confocal optical systems which may be used in the reading of a multi-layer information medium are described, for example, in JP-A 222856/1998 and SOM '94 technical digest (1994) 19.

Figure 5:
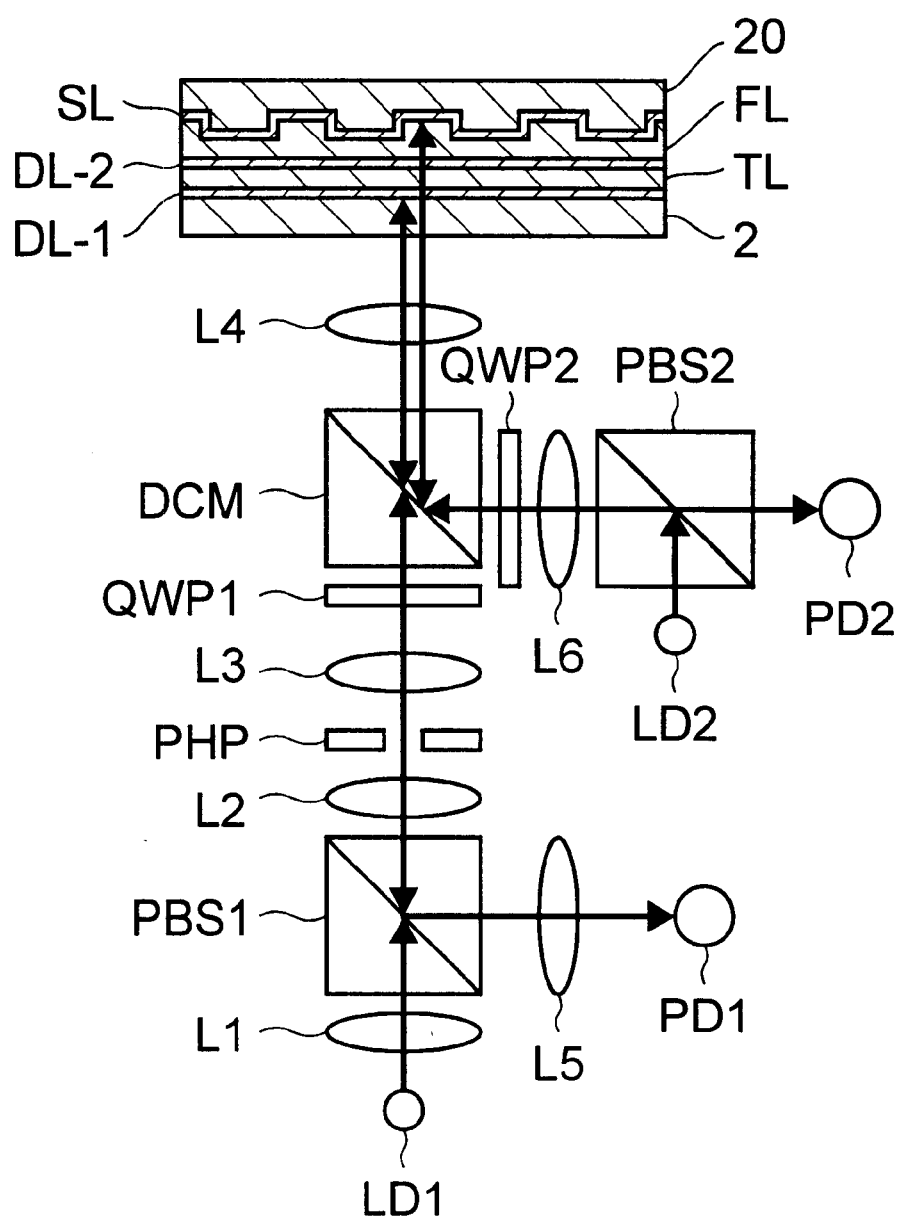
FIG. 5 is a view showing another embodiment of the optical pickup used for recording and reading of the optical information medium according to the present invention.

An embodiment of the optical pickup which is equipped with a confocal optical system and which can be used in the recording and reading of a multi-layer information medium is shown in FIG. 5 together with the medium. The medium shown in FIG. 5 has a structure comprising a substrate 2, and a data layer DL-1, a transparent layer TL, a data layer DL-2, a filter layer FL, a servo layer SL, and a servo substrate 20 disposed on the substrate 2 in this order.

This optical pickup has a structure similar to the optical pickup shown in FIG. 4 except that a lens L2, a pin-hole plate PHP, and a lens L3 have been incorporated between the polarizing beam splitter PBS 1 and the quarter-wave plate QWP1 in the light path of the data beam.

In this optical pickup, the data beam which has passed through the polarizing beam splitter PBS 1 is focused by the lens L2. A pin-hole plate PHP formed with a pinhole is arranged at the focal point, and the data beam which has passed through the pin hole is collimated by the lens L3 and after passing through the pathway similar to that of the optical pickup shown in FIG. 4, the beam is focused at the data layer DL-1 on the lower side of the multi-layer information medium. The data beam reflected by the data layer DL-1 goes back along the same pathway as the incidence into the medium. The data beam also reaches the data layer DL-2 after passing through the data layer DL-1 the data of which is to be read, and the beam is also reflected from the data layer DL-2 back to the optical pickup. This data beam, however, is out of focus at the data layer DL-2, and the beam reflected from the data layer DL-2 is not focused to the pinhole position of the pinhole plate PHP. The beam which failed to be unfocused at the pinhole is substantially blocked by the pinhole plate PHP. The cross talk between the data layers is thereby suppressed by the optical pickup equipped with the confocal optical system.

Next, constitution of various parts of the optical recording medium of the present invention is described in detail.

Filter Layer

The filter layer shown in FIGS. 1 to 3 is a layer which exhibits the absorption for one of the two recording/reading beams (two data beams, or one data beam and one servo beam) higher than the absorption for the other beam. To be more specific, the absorption of the filter layer for one recording/reading beam is preferably 80% or higher and more preferably 90% or higher, and the advantage of the present invention is not fully realized when this absorption is too low. On the other hand, the absorption for the other recording/reading beam is preferably 20% or lower and more preferably 10% or lower, and when this absorption is too high, reading of the information-storing layer by the recording/reading beam which has gone through the filter layer will be difficult, rendering the recording of the medium difficult in the case of a recording medium.

The material used for the filter layer is not particularly limited, and an adequate material may be selected from the materials exhibiting the desired spectral absorption characteristics, for example, from the dyes comprising an organic material or an inorganic material. Use of an organic dye is preferable, and use of an organic dye further comprising a resin is more preferable. Exemplary preferable resins include resins curable with UV or other active energy ray. Formation of the filter layer is facilitated by such admixture of the resin component compared to the use of the dye alone. For example, a uniform, relatively thick filter layer can be formed in a short period when a mixture of a UV-curable composition an a dye is spin coated and UV cured.

The dye used for the filter layer is not particularly limited, and an adequate dye may be selected from the dyes exhibiting the spectral absorption characteristics required for a filter layer, for example, from cyanine, phthalocyanine, and azo organic dyes. The dye may be modified as desired, for example, by introducing a substituent in the side chain of the dye in consideration of the compatibility with the resin. The filter layer may also comprise two or more dye layers each having different spectral absorption characteristics for facilitating the control of the spectral absorption characteristics.

When the filter layer contains a dye and a resin, the dye is not limited for its content, and the content may be determined depending on the type of the resin employed and to satisfy the required spectral absorption characteristics. The content is typically 1 to 10 mass %. An excessively low dye content is undesirable since increase in the thickness of the filter layer is required. On the other hand, excessively large content will result in the shortening of the pot life.

When the wavelength of the beam to be absorbed is relatively short, and to be more specific, when steep absorption is to be realized in the wavelength region of up to 450 nm, the filter layer may be constituted from a UV-curable resin layer free from the dye. The UV-curable resin layer may be formed by coating a composition containing a UV-curable composition and a photo initiator, and UV curing the coated film. The photoinitiator exhibits high absorption near the wavelength of the light beam used for the curing, and the thus cured film also exhibits high absorption near such wavelength. This is believed to be due to the condition that the photoinitiator is not completely decomposed in the course of curing and a part of the photoinitiator remains in intact or modified state after the curing. As a consequence, such layer can be used as a filter layer which exhibits selectively high absorption at the short wavelength region.

The photoinitiator used in the filter layer is not particularly limited, and an adequate photoinitiator may be selected from conventional photoinitiators such as benzoates, benzophenone derivatives, benzoin derivatives, thioxanthone derivatives, acetophenone derivatives, propiophenone derivatives, and benzyls depending on the wavelength of beam to be absorbed.

The thickness of the filter layer may be adequately determined to satisfy the required spectral absorption characteristics. However, the filter layer containing a resin wherein a dye or a photoinitiator is used for the absorption material is preferably formed to a thickness in the range of 1 to 30 μm. When the filter layer is too thin, sufficient absorption characteristics is less likely to be obtained. When the filter layer is too thick, number of the data layers included in the medium will be limited in view of the total thickness of the medium, and this is not preferable.

When the wavelength of the beam to be absorbed is relatively short, for example, up to 450 nm, a metal layer containing at least one metal (including semimetal) element may be used for the filter layer. Some metals including gold exhibit steep high absorption in the short wavelength region. In view of such situation, the type of the metal included and the thickness of the filter layer may be selected so that sufficient absorption and sufficient transmittance are reliably achieved at the target wavelength regions of absorption and transmittance, respectively. Examples of the metals which may be preferably used in the filter layer include Au, Pt, Cu and the like. The filter layer may also comprise two or more different metal layers each having different spectral absorption characteristics.

The thickness of the metal layer used as the filter layer may vary by the type of the metal used. However, the thickness of such layer is preferably in the range of 10 to 200 nm, and more preferably 20 to 100 nm. When the metal layer is too thin, the layer will fail to exhibit sufficient absorption at the target absorption wavelength region while excessively thick metal layer results in an insufficient transmittance at the target wavelength region.

The filter layer may also comprise an interference filter. Exemplary interference filters which may be used include a dielectric multi-layer film and a dielectric layer sandwiched between two metal thin films comprising Ag or the like.

In the embodiment of FIG. 3, the filter layer is provided only between the data layer and the servo layer, namely, only at one of the locations between the adjacent information-storing layers. The filter layer, however, may be also formed at other locations between adjacent information-storing layers as desired. To be more specific, two or more filter layers may be formed with three or more beams each having different wavelength being used for the recording or reading beam. For example, data layers DL-1, DL-2, and DL-3 may be formed in this order from the side of the light incidence with filter layers FL-1 and FL-2 respectively formed between the DL-1 and the DL-2 and between the DL-2 and the DL-3, and the DL-1, the DL-2 and the DL-3 may be read with the beams having a wavelength of 400 nm, 600 nm and 800 nm, respectively. In this case, the filter layer FL-1 is preferably the one exhibiting high absorption to the beam with a wavelength at around 400 nm and low absorption to the beams at around 600 nm and 800 nm. The filter layer FL-2 is not limited for its absorption for the beam with the wavelength at around 400 nm while it should exhibit high absorption at around 600 nm and low absorption at around 800 nm.

To be more specific, in the case of a medium wherein the number of the filter layers is "n" and which is to be used in a system wherein "n+1" recording/reading beams each having different wavelengths are used, the filter layer should exhibit a relatively high absorption for the reading/recording beam used for its closest information-storing layer on the side of the light incidence and a relatively low absorption for the reading/recording beam used for its closest information-storing layer on the side of the light exit. The "relatively high absorption" used herein designates an absorption of preferably 80% or higher, and more preferably 90% or higher, and the "relatively low absorption" used herein designates an absorption of preferably 20% or lower, and more preferably 10% or lower.

When two or more filter layers are formed, all of the filter layers may not necessarily comprise the same type of optical absorbing material. The filter layers, for example, may comprise a combination of a metal layer or an interference filter and a dye-containing filter layer.

In the medium of FIG. 3, the reflective layer (the servo layer SL) on the surface of the servo substrate 20 may be used as the filter layer instead of forming a filter layer between the data layer and the servo layer. In the case when the present invention is used in a read only medium, the transparent layer or the filter layer may be formed with pits, and a translucent reflective layer may be formed on the surface formed with the pits by sputtering or the like to thereby use the thus formed reflective layer also as the data layer. In this case, the reflective layer formed from a metal or a semi-metal may be used as the filter layer. In such case, the filter layer which also serves as the information-storing layer may preferably exhibit a relatively high reflectivity for the recording/reading beam used for the filter layer itself and a relatively low reflectivity for the recording/reading beam used for its closest information-storing layer on the side of the light incidence. If an information-storing layer is also present on the side of the light exit, the filter layer may preferably exhibit a relatively high transmittance for the recording/reading beam used for such information-storing layer.

The recording/reading beams having different wavelengths from each other are not particularly limited for their wavelengths. However, difference in the wavelength between these recording/reading beams is preferably in the range of 50 to 700 nm, and more preferably 100 to 400 nm. When the wavelength difference is too small, the filter layer will be required to have steep spectral absorption characteristics and selection of the material used for the filter layer will be difficult. When the wavelength difference is too large, difficulty is encountered in increasing the recording density of the entire medium or in obtaining sufficient servo accuracy.

The wavelength region wherein these recording/reading beams are present is preferably the wavelength region of 300 to 1000 nm, and more preferably 400 to 800 nm. A semiconductor laser oscillating a laser beam having a wavelength shorter than such range is difficult to obtain while use of a laser beam having a wavelength longer than such range is associated with difficulty in high density recording as well as difficulty in the reading of the information recorded at a high density.

Transparent Layer

The transparent layer in FIG. 3 preferably comprises a material which exhibits high transmittance to the recording/reading beam. The material used for the transparent layer is not limited. The transparent layer, however, is preferably formed from a resin since the transparent layer should be deposited to a considerable thickness. The process used for the formation of the transparent layer is not limited. In view of the ease of forming a uniform, transparent layer in short time, the transparent layer is preferably formed from a resin, and in particular, from a UV-curable resin or other active energy beam-curable resin.

The transparent layer formed from a UV-curable resin will exhibit a relatively steep absorption in the short wavelength region due to the influence of the photoinitiator as described above in the section of the "Filter layer". In order to reliably impart the transparent layer with a sufficient transparency to the recording/reading beam in the short wavelength region, an adequate type of photoinitiator should be selected depending on the wavelength of the recording/reading beam used.

When the transparent layer is provided in contact with the substrate 2, it should be noted that the difference between the refractive index of the transparent layer and the refractive index of the substrate is up to 0.1 at the wavelength of the recording/reading beam in order to suppress the reflection at the boundary between the transparent layer and the substrate.

The transparent layer is not particularly limited for its thickness, and the thickness may be adequately determined so that the cross talk between the data layers is within acceptable limits. Typically, the transparent layer has a thickness of at least 30 µm when an optical pickup of conventional type is used. An excessively thick transparent layer is likely to result in an unduly increased inconsistency in the thickness as well as increased internal stress, and such a thick transparent layer is also likely to invite increase in the total thickness of the medium. Accordingly, the transparent layer preferably has a thickness of up to 100 µm.

On the other hand, when a confocal optical system is adopted, the thickness of the transparent layer is determined depending on the resolution of the confocal optical system in the depth direction so that the cross talk between the data layers is within acceptable limits. To be more specific, the preferable thickness of the transparent layer is 5 µm or more when the data beam has a wavelength of about 300 to about 1000 nm although such thickness may vary with the wavelength of the data beam and the constitution of the confocal optical system. Use of a confocal optical system enables provision of a transparent layer with a reduced thickness of less than 30 µm, and no problem is induced even when the thickness is reduced to 20 µm or less.

When the medium has a disk shape and the transparent layer comprises a resin, the transparent layer is preferably formed by spin coating since the spin coating is a process which is capable of forming a relatively uniform transparent layer. In the spin coating, the resin is fed onto the surface of the substrate fixedly secured to a turntable, and the resin is spread over the substrate by rotating the substrate. The substrate, however, is formed with a center hole which is utilized in the mounting of the medium to the drive, and the center hole prevents the resin to be fed to the rotation center (i.e. center of the substrate) and the resin would be fed at an annular location at an equal distance from the rotation center. As the resin feeding location becomes remote from the rotation center, the radially outer portion of the resin layer becomes thick in relation to the radially inner portion of the layer, and the transparent layer would suffer from an increased thickness inconsistency in radial direction. In the case of a multi-layer information medium, number of the transparent layers increases with the number of the data layers, and such thickness inconsistency is accumulated with the increase in the number of the data layers. As a consequence, even if the data beam entered the substrate 2 in the outer peripheral region of the disk at a normal direction, the data beam reflected at the surface of the data layer will not be normal to the substrate 2, and the quantity of the light returning to the optical pickup will be reduced. The medium will then exhibit different reading outputs in the inner peripheral region and in the outer peripheral region.

In the case of an optical pickup equipped with a confocal optical system, a pinhole is provided in the optical system and the reading is accomplished by using the beam that had passed thorough this pinhole. Accordingly, when an optical pickup equipped with a confocal optical system is used, the range of the focus servo will be narrower, and therefore, a higher thickness consistency is required for the transparent layer.

In view of such situation, difference between the maximum thickness and minimum thickness of the transparent layer between recorded information-storing areas (area where the recording tracks are present) of two adjacent data layers or between the recorded information-storing area of the data layer and the servo information-storing areas of the servo layer is preferably up to 3 µm, and more preferably up to 2 µm. When the thickness inconsistency of the transparent layer is reduced to such range, the fluctuation in the reading output can be reduced. Although it may be preferable that the difference between the maximum and minimum thickness of the transparent layer is reduced to the lowest possible value, reduction of such difference to zero is difficult as long as the transparent layer is formed by spin coating, and the fluctuation in the reading output is sufficiently reduced when the thickness difference is within the above-specified range. Therefore, the thickness difference need not be reduced to less than 1 µm. In the disk-shaped medium, the recorded information-storing area is typically an annular area having a width of about 20 to about 50 mm.

It should be also noted that the resin layers other than the transparent layer, for example, the filter layer comprising a resin or a resin and a dye, a protective layer which is often provided on the surface of the medium, an adhesive layer, and the like may be formed by spin coating. These resin layers are also required to have reduced thickness inconsistency as in the case of the transparent layer.

In order to reduce the thickness inconsistency of the transparent layer, the filter layer, and other resin layers, the step of the spin coating is preferably accomplished by using the apparatus as described below.

Figure 6:
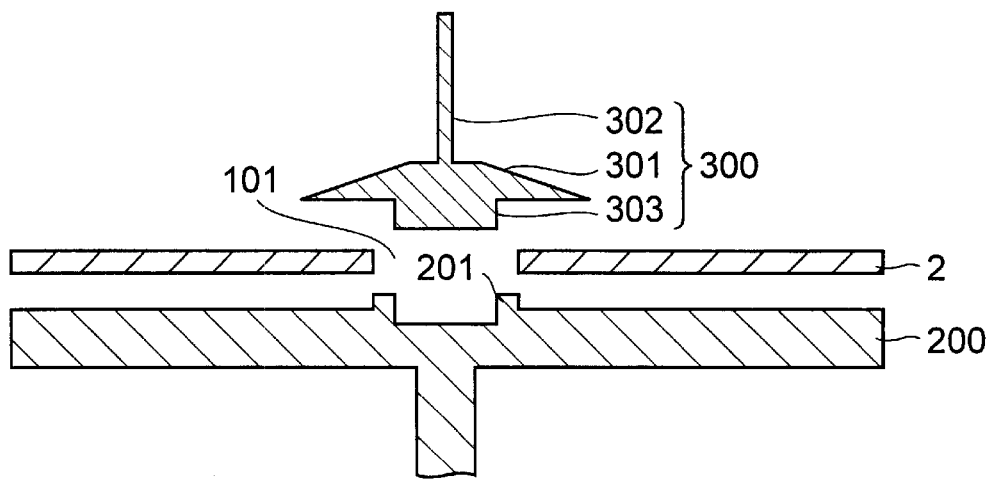
FIG. 6 is a cross-sectional view showing a step in the formation of the transparent layer.
Figure 7:
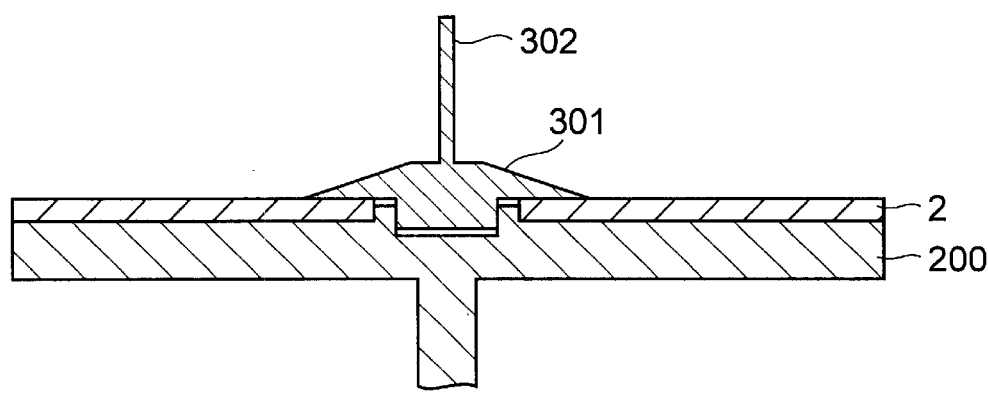
FIG. 7 is a cross-sectional view showing a step in the formation of the transparent layer.

The step of the spin coating is explained in the following by referring to an example wherein the transparent layer TL-1 is formed in the medium of FIG. 3. In this method, a substrate 2 formed with a center hole 101 is placed on a turntable 200 as shown in FIGS. 6 and 7. It should be noted that, when a transparent layer other than the TL-1 is formed, the substrate 2 has an information-storing layer or an information-storing layer and a resin layer already formed thereon. The substrate 2 is secured to the turntable 200 with its center hole 101 fitted on an annular ridge 201 of the turntable 200. FIGS. 6 and 7 are cross-sectional views showing only the end faces appearing at the section, and the views in depth direction are omitted. This also applies to the following cross-sectional views.

Next, the center hole 101 is covered with a plug means 300. The plug means 300 has a disk member 301 for covering the center hole 101, a support shaft 302 integrally formed with the disk member 301 at its center, and a projection 303 integrally formed with the disk member 301 on the side facing the center hole 101. By fitting the projection 303 inside the ridge 201, the plug means 300 is secured to the turntable 200 and the substrate 2 can be positioned in relation to the plug means 300. The method used in securing the substrate 2 and the plug means 300 to the turntable 200 is not particularly limited, and in an exemplary method, the substrate 2 is first fitted with the plug means 300, and the plug means 300 is then fitted in the turntable 200.

Figure 8:
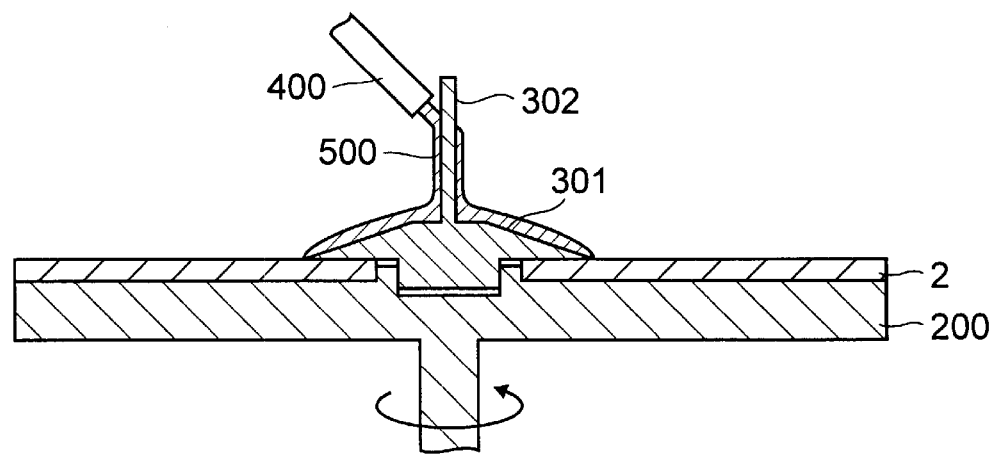
FIG. 8 is a cross-sectional view showing a step in the formation of the transparent layer.

Next, a coating solution 500 comprising a resin or a resin solution is poured as shown in FIG. 8 from a nozzle 400 which is a pouring means to deliver the coating solution 500 to the outer periphery of the support shaft 302. The turntable 200 is simultaneously rotated at a relatively low speed, and preferably at a rotation speed of 20 to 100 rpm so that the coating solution is uniformly distributed over the disk member 301.

Figure 9:
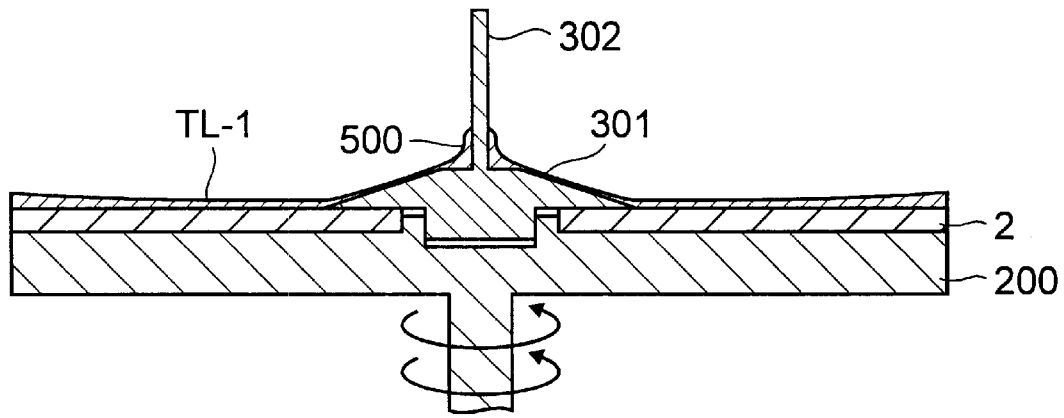
FIG. 9 is a cross-sectional view showing a step in the formation of the transparent layer.

Next, the turntable 200 is rotated at a relatively high speed to spread the coating solution 500 on the substrate 2 as shown in FIG. 9 and to thereby form the transparent layer TL-1 on the substrate 2.

The conditions used for the spreading of the coating solution are not particularly limited. It is known that the thickness of the coated film theoretically increases in relation to the square root of the coating solution viscosity if the spin coating is conducted such that the conditions other than the coating solution viscosity are identical. On the other hand, the coated film becomes thin with the increase in the rotation speed and the rotation time. Therefore, the rotation speed and the rotation time used in the spin coating may be adequately determined depending on the thickness of the transparent layer TL-1 to be formed and the coating solution viscosity.

Figure 10:
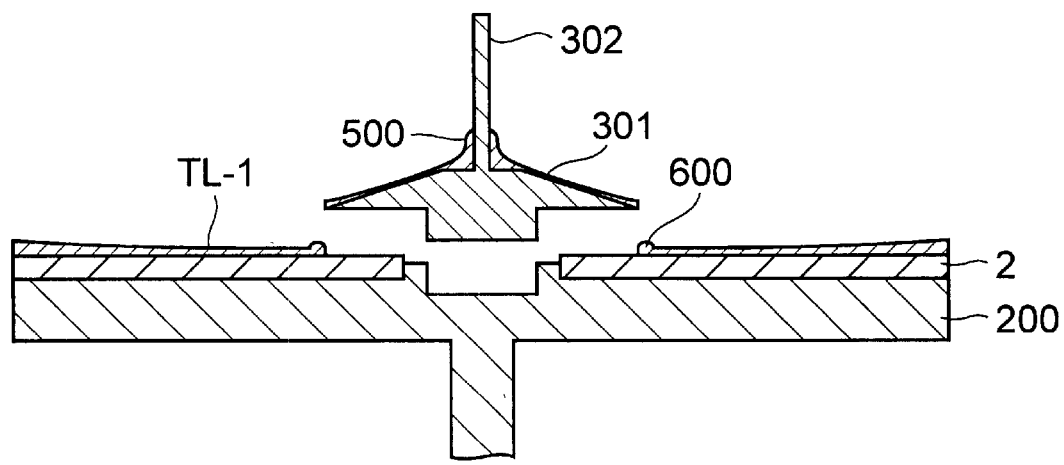
FIG. 10 is a cross-sectional view showing a step in the formation of the transparent layer.

Next, the plug means 300 is separated from the substrate 2 as shown in FIG. 10. As the outer periphery of the disk member 301 leaves the substrate 2, the inner periphery of the transparent layer TL-1 is lifted, and an annular raised rim 600 is formed as shown in FIG. 10. The annular raised rim 600 is the portion wherein the resin constituting the transparent layer TL-1 is continuously uplifted.

Figure 11:
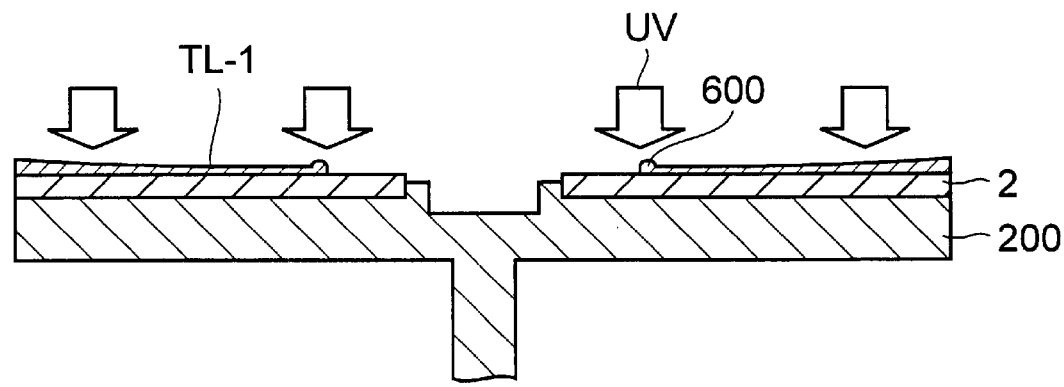
FIG. 11 is a cross-sectional view showing a step in the formation of the transparent layer.

When the coating solution used contains a UV-curable resin, the transparent layer TL-1 is cured by UV irradiation as shown in FIG. 11. Although the UV irradiation is conducted in FIG. 11 on the turntable 200, the curing may also be conducted on a curing stage separately provided from the turntable. Also, the separation of the plug means may be accomplished while the substrate is rotated.

The annular raised rim 600 formed by such method has a cross section of smooth curve (arc) as shown in the drawings. On the contrary, if the plug means 300 is separated after the curing of the transparent layer TL-1, a continuous annular raised rim will not be formed, and even if some projections were formed at the corresponding position, the projections formed will be burrs and not an annular raised rim continuously extending in peripheral direction. Such procedure also involves the problem that debris of the cured resin are likely to scatter over the substrate 2.

Height of the annular raised rim 600, namely, height of the top of the annular raised rim measured from the lowest part in the surface of the resin layer near the annular raised rim is typically in the range of 1 to 100 $\mu$m. Width of the annular raised rim 600, namely, distance between the lowest part in the surface of the transparent layer near the annular raised rim to the inner periphery of the transparent layer is typically in the range of 0.5 to 3 mm. It should be noted that the height and the width of the annular raised rim increases with the increase in the thickness of the resin layer.

After completing the formation of the first transparent layer TL-1, first data layer DL-1 is formed by means of sputtering or the like. The data layer is formed such that the inner periphery of the data layer is located at a position radially outside the inner periphery of the underlying transparent layer.

Next, a second transparent layer TL-2 is formed by using the plug means 300 again. This time, the annular raised rim 600 is already present at the inner periphery of the first transparent layer TL-1. If the plug means 300 used is the same as the one used in the formation of the TL-1, spreading of the resin will be inhibited by the annular raised rim 600 and formation of the TL-2 is likely to be interfered. In addition, the annular raised rim formed in TL-2 will be formed over the annular raised rim of the TL-1 to result in great deviation of the resin layer thickness near the disk inner periphery from the designed value, and the distance between the data layers will be increased in the region near the inner periphery.

Figure 12:
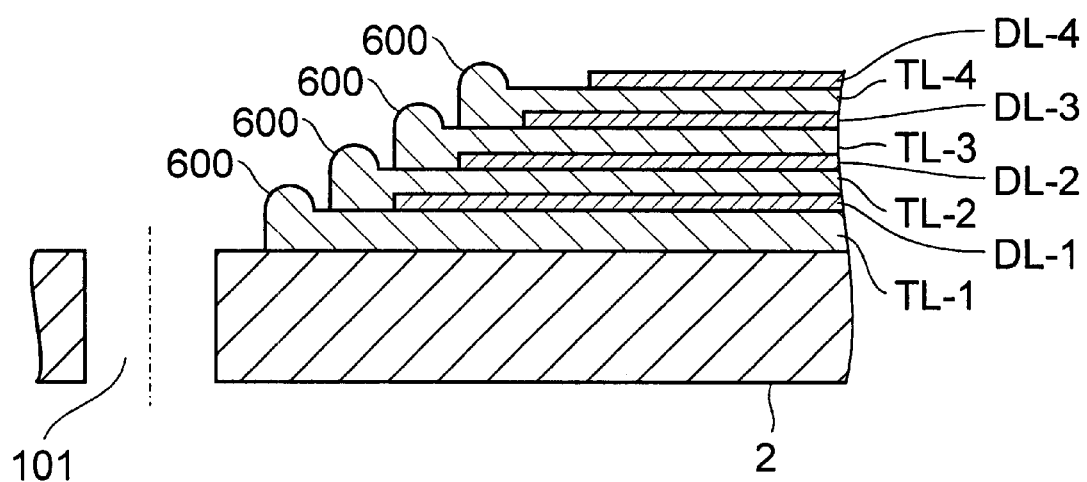
FIG. 12 is a cross-sectional view showing the medium near the inner periphery of the substrate where the transparent layers and the data layers have been formed.

In order to solve such problem, the resin layers are formed in the present invention such that the annular raised rims of the resin layers are located in mutually displaced relationship. FIG. 12 is a cross-sectional view of the substrate 2 near its inner periphery wherein the transparent layers TL-1 to TL-4 and the data layers DL-1 to DL-4 have been alternately disposed. In FIG. 12, the transparent layer remote from the substrate 2 has a larger inner diameter, and as a consequence, the inner periphery of the transparent layer laminate after the formation of the transparent layers has a step-like configuration, and the annular raised rims 600 are left exposed on the surface of the thus formed steps. As described above, the problem as described above can be solved by disposing the transparent layers in the form of steps so that the subsequently formed transparent layer does not cover the annular raised rim of the preceding transparent layer.

Figure 13:
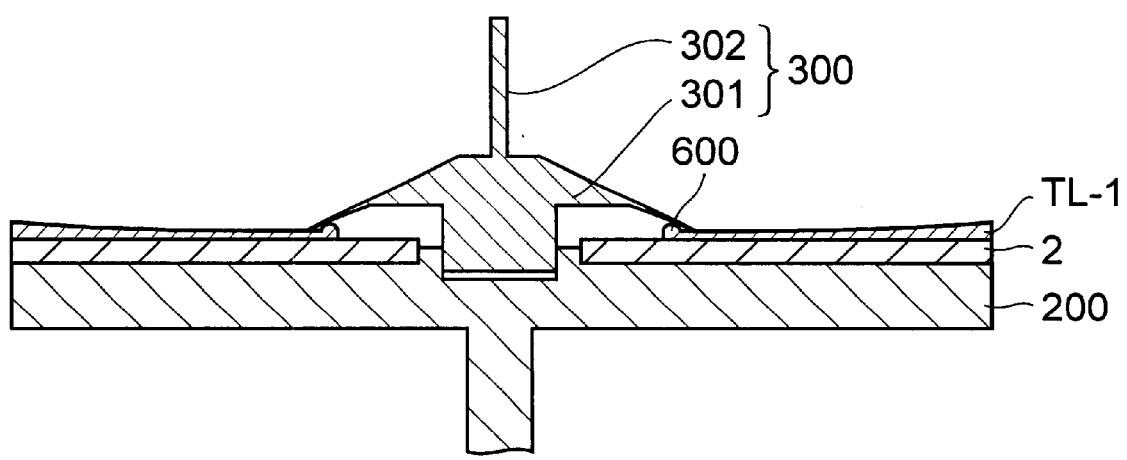
FIG. 13 is a cross-sectional view showing a procedure for forming the second transparent layer.

In order to form a transparent layer laminate having the inner periphery of step-like configuration, the second transparent layer TL-2 may be formed by using a plug means 300 as shown in FIG. 13. The procedure shown in FIG. 13 is substantially the same as the procedure shown in FIG. 6 except for the use of the substrate 2 which is already formed with the transparent layer TL-1. The plug means 300 used, however, is different. The disk member 301 of this plug means 300 has a diameter larger than the one shown in FIG. 6 in order to form a transparent layer having an inner diameter larger than the transparent layer TL-1. The disk member 301 is also bored in its lower surface so that the member will be in contact with the flat area of the transparent layer TL-1 by bridging the annular raised rim 600. The third and the following transparent layers may be formed by using a plug means having a disk member of similar configuration but of the size which can cover the annular raised rim of the preceding transparent layer.

The plug means used in the procedure as described above is not limited for its constitution as long as its includes a disk member for blocking the center hole of the disk substrate. Spin coating methods using a plug means for blocking the center hole of the disk substrate are described, for example, in JP-A 320850/1998, JP-A 249264/1998, JP-A 289489/1998, JP-A 195250/1999, and JP-A 195251/1999. These documents disclose methods wherein the center hole of the disk is blocked with a plug means such as a plate-shaped substrate, a disk member, a plug member, or a cap, and the resin is supplied to a location near the center of such plug means, namely, near the rotation center to thereby reduce the thickness unevenness in radial direction of the resin layer. However, these documents refer neither to the multi-layer information medium nor to the formation of annular raised rim at the inner periphery of the resin layer in the spin coating. In addition, the plug means described in these documents suffer from the problems as described below.

Of these documents, JP-A 320850/1998, JP-A 249264/1998, and JP-A 195250/1999 do not disclose removal of the plug means, namely, the plate-shaped member or the cap after the spin coating, and employment of such methods in an industrial production is difficult. These documents are also silent about the curing of the resin layer after the separation of the plug means from the disk substrate.

JP-A 289489/1998 discloses curing of the resin layer while rotating the disk substrate after the spin coating and removal of the plate-shaped member, namely, the plug means by knocking or electromagnetic suction. The removal of the plug means by knocking or electromagnetic suction, however, applies a considerable acceleration to the plug means, and this is likely to cause turbulence in the resin coating film.

JP-A 195251/1999 discloses a plug means comprising a spherical cap and a support member integrally formed with the spherical cap at its center. JP-A 195251/1999 teaches that this support member facilitates the attachment/detachment and the positioning of the plug means. The support member of JP-A 195251/1999 comprises either a hollow cylinder provided with at least one opening or a plurality of rods. The resin layer is formed on the disk substrate by introducing the resin into the interior of the hollow cylinder or into the area surrounded by the plurality of rods, and rotating the disk substrate together with the plug means. These plug means certainly facilitate removal of the plug means. JP-A 195251/1999 discloses curing of the resin layer in stationary state after separating the plug means from the disk substrate.

In JP-A 195251/1999, the spin coating is accomplished by allowing the resin to flow from the openings provided on the hollow cylinder of the plug means or from the intervals between adjacent rods of the plug means. Therefore, the resin is once stopped at the wall (i.e. area of the wall other than the opening) or rods of the support member, and the stopped resin may sweep onto the disk substrate at an unexpected timing to result in an uneven coating. In addition, these plug means are difficult to clean since the part that becomes in contact with the resin is quite complicated in shape and a large area is brought in contact with the resin. The resin remaining on the plug means may become a cause of an uneven coating. Furthermore, as shown from the results of Table 1 in JP-A 195251/1999 wherein variation of the coating thickness is shown in relation to the outer diameter of the hollow cylinder of from 4 to 16 mm, the unevenness of the thickness depends on the outer diameter of the hollow cylinder, and the degree of the coating unevenness increases with the increase in the outer diameter of the hollow cylinder. To be more specific, even when the resin is supplied to the interior of the hollow cylinder, the starting point of the coating will be deviated from the center of rotation, and the starting point of the coating will be the position where the outer periphery of the hollow cylinder is located. In consideration of the relatively high viscosity of the resin, the outer diameter of the hollow cylinder cannot be reduced to below 4 mm. Therefore, the thickness unevenness of the resin coating is difficult to reduce by the method described in JP-A 195251/1999.

In contrast to such conventional plug means, the plug means 300 shown in FIG. 6 comprises a disk member 301 and a support shaft 302 provided thereon. Therefore, handling of the plug means 300 in the production of the medium is easy, and in particular, removal of the plug means 300 after spin coating is facilitated.

JP-A 195251/1999 discloses a plug means constituted from a cap and a support member comprising a hollow cylinder or a plurality of rods integrally formed with the cap. The plug means shown in FIG. 6 has various advantages over such plug means as described below.

In JP-A 195251/1999, the resin is once blocked at the wall or rods of the support member, and this may cause an uneven coating as described above. In contrast, in the plug means shown in FIG. 6, the spin coating is accomplished by supplying the coating solution on the outer periphery of the support shaft and the thickness evenness is unlikely to be induced. In addition, in the case of the plug means shown in FIG. 6, the part to which the resin attaches is the outer periphery of the support shaft, and cleaning of the plug means is easy compared to JP-A 195251/1999. Furthermore, the coating solution is supplied in JP-A 195251/1999 to the interior of the hollow cylinder and the outer diameter of the support member can not be reduced below certain level if the mobility of the coating solution with relatively high viscosity is to be ensured, and accordingly, the starting point of the coating is relatively remote from the center of rotation. In contrast, the outer diameter of the support shaft of the plug means shown in FIG. 6 can be reduced to a value significantly smaller than that of JP-A 195251/1999, and the thickness unevenness of the coating can be markedly reduced compared to JP-A 195251/1999.

It should be noted that such advantages are realized not only by the plug means constituted as shown in FIG. 6, and as long as the plug means is constituted from a disk member and a support shaft, the advantages maybe realized. The plug means 300 shown in FIG. 6 comprises a frustoconical disk member 301 and a columnar support shaft 302. Other embodiments of the plug means which may be adopted include those having the structures as shown in FIGS. 14A to 14D.

Figure 14A:
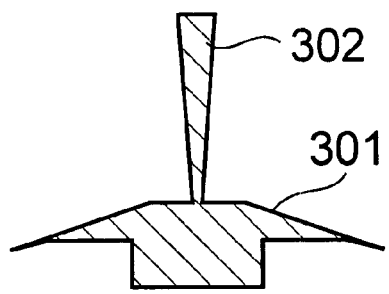
FIGS. 14A to 14D are cross-sectional views showing various embodiments of the plug means.

The plug means shown in FIG. 14A comprises a frustoconical disk member 301 having bored lower surface as in the case of FIG. 13 and an inverted frustoconical support shaft 302. When such plug means is used, the starting point for the coating of the coating solution can be brought nearer to the center of the disk member 301 to further reduce the thickness unevenness of the coated layer. In addition, provision of such support shaft 302 is not associated with decrease in its mechanical strength in contrast to the case wherein the diameter of the entire support shaft 302 is reduced. Furthermore, the plug means of such configuration is advantageous in attaching/detaching and carrying of the plug means since gripping of the support shaft 302 with a chuck and the like is facilitated to avoid dropping. It should be noted that not the entire support shaft 302 needs to be inverted frustoconical. To be more specific, at least a part of the support shaft 302 should be frustoconical with its diameter reducing toward the disk member 301 and the remaining portion of the shaft on the side of the disk member may not necessarily be tapered as long as the diameter does not increase toward the disk member.

Figure 14B:
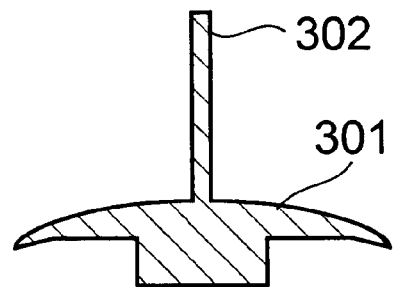
Figure 14C:
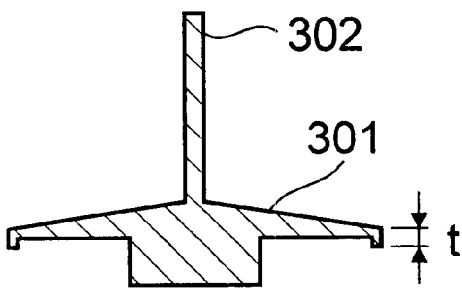
Figure 14D:
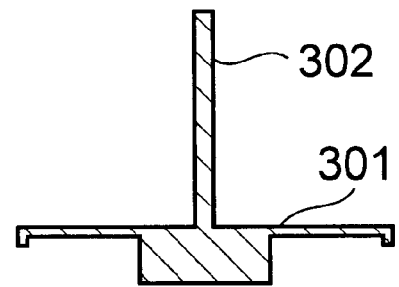

The plug means shown in FIG. 14B is different from the one shown in FIG. 14A in its cross-sectional configuration of the disk member 301. In order to facilitate consistent spreading of the coating solution on the disk member 301, the disk member 301 may preferably have a thickness gradually decreasing toward its outer periphery. In such case, the upper surface where the coating solution spreads may have a rectilinear cross section as shown in FIG. 14A or a curved cross section as shown in FIG. 14B. In addition, the disk member 301 may have a vertical outer periphery as shown in FIG. 14C, and in such as case, the thickness t of the disk member 301 at its periphery is preferably up to 0.4 mm since even coating of the resin layer is difficult at an excessively large thickness t. The disk member 301 may also have an even thickness as shown in FIG. 14D.

The plug means shown in FIGS. 14A to 14D are those wherein lower surface of the disk member 301 has been bored to correspond to the formation of the second or the following resin layer.

In the plug means, the minimum diameter of the support shaft 302 near the disk member 301 is preferably less than 4 mm, and more preferably 2 mm or less. When the diameter of the support shaft 302 near the disk member 301 is too large, the starting point of the coating will be remote from the center of the disk member 301 to invite an increase in the thickness unevenness in the radial direction of the resin layer. When the diameter of the support shaft 302 near the disk member 301 is too small, the support shaft 302 will suffer from insufficient mechanical strength. Therefore, the minimum diameter is preferably at least 0.5 mm, and more preferably at least 0.7 mm. The support shaft 302 is not limited for its length, and an adequate length may be selected by taking ease of supplying the coating solution to the outer periphery, ease of the gripping and the like into consideration. The length of the support shaft, however, is preferably in the range of 5 to 100 mm, and more preferably 10 to 30 mm. An excessively short support shaft 302 is associated with difficulty in supplying the coating solution to its outer periphery as well as difficulty in the gripping. In contrast, an excessively long support shaft 302 suffers from handling inconvenience.

The diameter of the disk member 301 is not limited as long as it is larger than the diameter of the center hole 101 of the disk substrate and smaller than the inner diameter of the annular information recording area of the disk substrate. The diameter of the diskmember 301, however, is preferably at least 4 mm, and more preferably at least 8 mm larger than the diameter of the center hole 101 in consideration of the risk of the coating solution 500 going underneath the disk member 301 onto the periphery of the center hole 101 (inner periphery of the disk substrate). The diameter of the disk member 301 is preferably at least 3 mm, and more preferably at least at least 5 mm smaller than the inner diameter of the information a recording area since the configuration of the resin layer near the disk member 301 may be affected by the removal of the disk member 301. Although the diameter of the disk member 301 employed may vary according to the diameter of the center hole and the inner diameter of the information recording area, the diameter of the disk member 301 is typically in the range of 20 to 40 mm, and preferably 25 to 38 mm when the optical disk has a diameter of about 60 to 130 mm.

The material used for constituting the plug means is not particularly limited and the material may be a metal, a resin, a ceramics, or a composite material containing two or more such materials. The disk member 301 and the support shaft 302 may also comprise different materials. In view of the mechanical strength, durability, and dimensional precision, the plug means preferably comprises a metal. Exemplary preferable metals include stainless steel alloy, aluminum, and aluminum alloy.

Surface tension of the surface of the plug means 300, and in particular, the entire surface of the disk member 301 is preferably lower than that of the coating solution. When the surface of the plug means 300 is less wettable to the coating solution, removal by washing of the coating solution that has attached to the surface of the plug means will be facilitated. The surface tension of the plug means can be controlled by adequately selecting the material used for the plug means. However, it is more preferable that the area where surface tension is to be reduced is subjected to a water- and oil-repellent treatment such as treatment with teflon.

Servo Layer

The servo layer is a reflective layer formed on the servo substrate 20, and the servo layer is formed with the projections and depressions carrying the tracking servo information. The servo layer carries tracking servo information corresponding to the projections and depressions. Grooves and/or pits are typically used for the projections and depressions.

The reflective layer constituting the servo layer is not particularly limited for its constitution, and the reflective layer formed may be similar to those formed in conventional optical information media. The reflective layer may typically comprise a metal or semimetal such as Al, Au, Ag, Pt, Cu, Ni, Cr, Ti, or Si as a simple substance or as an alloy containing at least one of such metals and semimetals. The reflective layer is typically formed to a thickness of 10 to 300 nm. A thickness below such range is likely to result in an insufficient reflectivity while the thickness in excess of such range is not advantageous in cost since increase in the thickness does not result in significant increase of the reflectivity. The reflective layer is preferably formed by vapor deposition such as sputtering and evaporation.

Data Layer

When the present invention is applied to an optical recording medium, the data layer includes at least a recording layer comprising a recording material. The optical recording medium to which the present invention is applied is not limited particular type, and applicable media include a rewritable medium or a write once medium employing a phase change recording material, a rewritable medium employing a magneto optical recording material, a write once medium employing an organic dye. However, use of a phase change recording material is preferable in view of high light transmittance compared to other recording materials, and accordingly, capability of increasing the number of recording layers.

The composition of the phase change recording material is not particularly limited, and the material is preferably the one containing at least Sb and Te. However, crystallization temperature of the recording layer containing Sb and Te as the only components is as low as about 130° C. and the storage reliability is insufficient, and therefore, the recording layer may preferably comprise elements other than Sb and Te. Such element is preferably element M (element M is at least one element selected from In, Ag, Au, Bi, Se, Al, P, Ge, H, Si, C, V, W, Ta, Zn, Ti, Ce, Tb, Sn, Pb, Pd, and Y), and among these, the preferred is Ge in view of the high effect in improving the storage reliability.

When the atomic ratio of the elements constituting the recording layer is represented by the formula (I):

$$Sb_aTe_bM_c \qquad (I),$$

wherein $a+b+c=1$, $a$, $b$, and $c$ are preferably such that:

$0.2 \leq a \leq 0.85$, $0.1 \leq b \leq 0.6$, and $0 \leq c \leq 0.25$, and more preferably, $0.01 \leq c \leq 0.25$ When the content of Sb is too low, crystallization speed will be insufficient and the overwriting will be difficult. On the other hand, when the Sb content is too high, crystallization speed will be excessively high and formation of amorphous record marks will be difficult. When the content of M is too low, the effect of M addition will be insufficient while addition of M in an excessive amount will result in insufficient alteration of the reflectivity with the phase change, and hence, in an insufficient degree of modulation. When Te content is too low, formation of record marks will be difficult due to the difficulty in amorphization. On the other hand, when the Te content is too high, crystallization speed will be insufficient and overwriting will be difficult.

A phase change recording medium is generally used as a rewritable medium. In the present invention, however, the phase change recording medium may be used as a write once medium. The "write once medium" used herein designates a medium which is recordable but wherein erasure of the once recorded record mark is not ensured, and in the case of a write once medium, overwriting of the record marks recorded in the recording track by erasing the record marks is not intended. Advantages associated with the use of a phase change recording medium for the write once medium are as described below.

In the case of a multi-layer recording medium, a plurality of recording layers are disposed one on another, and this structure is accompanied with an increased loss in the light quantity of the recording/reading beam. Therefore, use of a thinnest possible recording layer is desired. Decrease in the thickness of the recording layer, however, invites an increase in the cooling speed of the recording layer after the recording beam irradiation. Crystallization is less likely to take place at a higher cooling speed, and use of a composition which easily undergo crystallization is required to ensure the erasability. In other words, considerable increase in the crystallization speed of the recording layer will be required. A recording layer of high crystallization speed, however, is associated with the problem of higher occurrence of the self erase as described below. In the recording, heat dissipates from the beam spot of the recording beam in the lateral direction of the recording layer, and cooling of the record marks is inhibited by this heat. When the recording layer has a high crystallization speed, the record marks are partly recrystallized due to such cooling inhibition, and the size of the record mark formed will be reduced. To be more specific, the phenomenon often encountered is erasure of the leading edge of the record mark (the part first irradiated with the beam spot) or the trailing edge of the record mark. Such phenomenon is referred in the present invention as the "self erase". The self erase is associated with decrease in the C/N or increase in the jitter.

As described above, when the thickness of the recording layer is reduced, it will be difficult to simultaneously ensure sufficient erasability and suppress the self erase. In contrast, when a medium having a phase change recording layer is used as a write once medium, there will be no need to erase the record marks, and hence, to consider the crystallization speed of the recording layer. Accordingly, no problem will be induced even if the crystallization speed of the recording layer were reduced to the level where no substantial influence on the self erase is induced. In addition, when overwriting is conducted, increase in the crystallization speed of the recording layer is required with the increase in the linear velocity of the medium in the recording, and this also invites increased likeliness of self erase. However, if the recording is conducted only once with no overwriting operation, it will be possible to conduct the recording at a high linear velocity, for example, at a linear velocity of about 10 m/s in a recording layer having a relatively slow crystallization speed with reduced likeliness of self erase, and a high data transfer rate is easily realized.

As described above, the medium of the present invention has a plurality of recording layers disposed one on another and loss of the light quantity of the recording/reading beam is accordingly increased. Therefore, use of a thinnest possible recording layer is preferable with the function of the recording layer maintained. However, an excessively thin recording layer can no longer function as a recording layer, and the recording layer preferably has a thickness of 2 to 50 nm, and more preferably, 4 to 20 nm.

When a phase change recording layer is employed, the data layer may preferably have the structure as shown for DL-1 in FIG. 3. This data layer has a structure wherein the recording layer 4 is sandwiched between the first dielectric layer 31 and the second dielectric layer 32. When such structure is adopted, the recording layer and the dielectric layers are preferably formed by sputtering. The dielectric material used in the dielectric layers may be a compound containing at least one metal component selected from Si, Ge, Zn, Al, and rare earth metals, and the compound is preferably an oxide, a nitride, a sulfide, or a fluoride. A mixture containing two or more such compounds may be also used. Each dielectric layer may preferably have a thickness of 10 to 500 nm.

In the present invention, use of the recording layer with a reduced thickness is preferable in order to reduce the loss in the light quantity of the recording/reading beam. Decrease in the thickness of the phase change recording layer, however, is associated with a decrease in the degree of modulation, namely, with a decrease in the difference in reflectivity between the amorphous record mark and the crystalline region. In order to increase the degree of modulation, the dielectric layer is preferably formed as a laminate of two or more layers each having different refractive index. Such multi-layer structure also results in an increased flexibility of optical design, and increase in the light transmittance of the entire data layer can be realized. An exemplary dielectric layer of multi-layer structure is a laminate of at least one layer selected from magnesium fluoride layer, manganese fluoride layer, germanium nitride oxide layer, and silicon oxide layer with a $ZnS$—$SiO_2$ layer.

When a plurality of recording layers are formed, intensity of the recording beam reaching the particular recording layer reduces with the increase in the distance of the recording layer from the surface of the recording beam incidence into the medium. Therefore, recording sensitivity of the recording layer is preferably adjusted corresponding to the intensity of the recording beam reaching to the particular recording layer. In the case of recording materials wherein heat mode recording is conducted as in the case of phase change recording materials, increase in the thickness of the recording layer results in an increase in heat storage, and hence, in an increase in the recording sensitivity. In view of such situation, the thickness of the recording layer remote from the surface of the recording beam incidence may be increased as required compared to the recording layer near the surface of the recording beam incidence. However, adjacent two recording layers may have an identical thickness. In addition, the recording/reading beam used in the recording layer remote from the surface of the recording beam incidence is the recording/reading beam which has passed through other recording layers, and for the purpose of leveling the reading properties of the recording layers, a recording layer near the surface of the recording beam incidence may preferably have a higher light transmittance. In consideration of such light transmittance, it is also preferable that the recording layer remote from the surface of the recording beam incidence has an increased thickness.

It should be noted that the adjustment of the recording sensitivity and the transmittance can also be accomplished through control of the composition of the recording layer. In such case, all recording layers may be formed to an identical thickness, or alternatively, control of the composition can be combined with the control of the thickness.

The present invention is also applicable to a read only medium. The data layers of such medium may comprise either a layer formed with pits carrying the recorded information or a layer of a write once medium carrying the preliminarily recorded data. In the former case, the pits are generally formed in the transparent layer or the filter layer, and a translucent reflective layer is formed on the surface of the layer formed with the pits. The reflective layer will then serve as the data layer. Examples of such translucent reflective layers are an extremely thin metal layer and a silicon layer. In such read only medium, reflectivity of the data layer may be controlled for the leveling of the readout signal. To be more specific, the reflectivity may be controlled such that the data layer with the smaller quantity of light reached exhibits higher reflectivity. When the reflectivity is controlled as described above, the data layer near the surface of the beam incidence will exhibit higher light transmittance and marked attenuation in the quantity of the light reaching the data layer remote from the surface of the beam incidence will be avoided.

In the present invention, number of the data layers included in the medium is not limited as long as two or more data layers are included. An excessive number of data layers, however, results in unduly increased thickness of the medium and the effect of the thickness inconsistency of the transparent layer formed by spin coating will also surpass the acceptable level. Accordingly, the number of the data layers is preferably up to 10, and more preferably up to 6.

When a plurality of information-storing layers are disposed one on another, quantity of the light reflected from the information-storing layer will be reduced. However, it has been found in the investigation of the inventors of the present invention that sufficient C/N at the data layer and sufficient servo signal at the servo layer are attained when the maximum reflectivity of the information-storing layer is 5% or less. However, sufficient C/N and servo signal intensity will not be ensured when the reflectivity is excessively low, and the information-storing layer may preferably have a maximum reflectivity of at least 0.1%.

Substrate 2 and Servo Substrate 20

The substrate 2 preferably comprises a material which is substantially transparent to the recording/reading beam such as a resin or glass since the recording/reading beam is irradiated through the substrate 2. Among such materials, use of a resin is preferable in view of the handling convenience and the low price, and exemplary resins include acrylic resins, polycarbonates, epoxy resins, and polyolefins. However, when the recording/reading beam used has a wavelength as short as about 450 nm or below, a polycarbonate substrate will exhibit an excessively high absorption of the recording/reading beam, and use of a material such as an amorphous polyolefin exhibiting lower optical absorption to a short wavelength beam is preferable.

The substrate 2 is not limited for its shape and dimension. The substrate 2, however, is typically a disk having a thickness of at least 5 μm and preferably about 30 μm to 3 mm and a diameter of about 50 to 360 mm.

The servo substrate 20 shown in FIG. 3 may comprise a resin or a glass as in the case of the substrate 2. Use of a resin, however, is preferable in view of the ease of forming the servo information-storing projections and depressions by injection molding. It should be noted that the servo substrate 20 is not necessary transparent. The servo substrate 20 is also not limited for its thickness, and an adequate thickness may be selected, for example, from the range described for the substrate 2. However, when the substrate 2 has a relatively low rigidity, the rigidity of the entire medium is preferably ensured by increasing the thickness of the servo substrate 20 to a considerable degree.

The present invention has been described in the foregoing by referring to a multi-layer information medium which has a filter layer and which is used in a system wherein two or more recording/reading beams each having different wavelength are used. The present invention, however, is also useful in a medium having no filter layer since the main advantages of the present invention will be realized when the resin layers are formed in a multi-layer information medium by spin coating.

EXAMPLES

Example 1

A sample of optical recording disk having the structure as shown in FIG. 3 was produced by the procedure as described below.

Four transparent layers TL-1 to TL-4 and four data layers DL-1 to DL-4 were alternately disposed on one surface of a substrate 2 comprising a glass disk which had been toughened on both surfaces (thickness, 1.2 mm; diameter 120 mm).

The transparent layers were formed by the method of the present invention utilizing the plug means according to the procedure as described below. The plug means used was formed from stainless steel, and had the configuration as shown in FIG. 13. The disk member 301 had a diameter of 23 mm in the case of the disk member used for formation of TL-1, 28 mm in the case of the disk member used for formation of TL-2, 33 mm in the case of the disk member used for formation of TL-3, and 38 mm in the case of the disk member used for formation of TL-4. The support shaft 302 of the plug means had a diameter of 1 mm and a length of 20 mm in all cases. After covering the center hole of the substrate with the plug means, UV-curable resin (SD318 by Dainippon Ink & Chemicals, Inc.) was supplied on the outer periphery of the support shaft 302 for spin coating at a rotation speed of 3000 rpm for 5 seconds. The plug means was thereafter removed, and the coating was UV cured to complete the formation of the transparent layer.

The thus formed transparent layers were evaluated for their thickness inconsistency by using a laser focus displacement meter. The transparent layers all had an average thickness of 13.6 μm and the difference between the maximum thickness and the minimum thickness (thickness inconsistency) was within 2 μm. The thickness was measured at an interval of 5 mm in radial direction of the recorded information-storing area (the area at a radial distance of 20 to 58 mm from the center of the disk). As shown in FIG. 12, the inner peripheries of the transparent layers formed steps, and the annular raised rim 600 of the transparent layer was not overlaid on one another. The annular raised rim of the transparent layers had a height of 15 μm and a width of 1.5 mm.

The recording layer 4 included in each data layer had a composition (atomic ratio) of:

$Sb_{22.1}Te_{56.0}Ge_{21.9}$

The recording layers 4 were formed to a thickness of 5 nm, 5 nm, 7 nm, and 13 nm, respectively, from the side of the data beam incidence. The recording layer 4 was formed by magnetron sputtering system and the thickness was adjusted by controlling the power, pressure, and time of the sputtering.

The first dielectric layer 31 and the second dielectric layer 32 included in each data layer was adjusted to the range of 75 to 271 nm to thereby ensure absorption of the recording layer and simultaneously increase the light transmittance of the entire data layer. These dielectric layers were formed by magnetron sputtering system and the composition of the layers was ZnS (80 mole %)—SiO$_2$ (20 mole %).

In the meanwhile, a servo substrate 20 comprising a disk having a thickness of 1.2 mm and a diameter of 120 mm was prepared by injection molding a polycarbonate. This disk had a groove having a width of 0.76 μm and a depth of 183 nm formed therewith. On the surface of the servo substrate 20 where the groove had been formed, a gold layer was deposited as a servo layer SL to a thickness of 100 nm by sputtering. On the surface of this reflective layer was formed a filter layer FL, and the filter layer FL was formed by spin coating a mixture (dye content, 3 mass %) of a phthalocyanine dye (Blue-N manufactured by Nippon Kayaku Co., Ltd.) and a UV-curable resin (SD318 manufactured by Dainippon Ink & Chemicals, Inc.) at a rotation speed of 3500 rpm for 5 seconds and UV curing the layer. The spin coating was conducted by using the plug means used in the formation of the transparent layer TL-1. The thus formed filter layer FL was evaluated for its thickness by the same procedure as the transparent layer. The filter layer had an average thickness of 11 μm and the thickness inconsistency was within 2 μm.

The filter layer FL exhibited an absorption of 95% at a wavelength of 660 nm, and 8% at a wavelength of 780 nm. It should be noted that the absorption is a value evaluated by forming the filter layer alone on a transparent plate, and evaluating the sample.

Next, UV-curable resin (DVD-003 manufactured by Nippon Kayaku Co., Ltd.) was dripped on the top surface of the laminate including the substrate 2 (surface of the uppermost data layer DL-4), and the laminate including the servo substrate 20 was aligned on the laminate including the substrate 2. The laminate was rotated at 5000 rpm for 2 seconds, and the UV-curable resin was cured by UV irradiation through the substrate 2. The laminate including the substrate 2 and the laminate including the servo substrate 20 were thereby adhered by an intervening transparent layer TL-5 of 35 μm thick, and a sample of the optical recording disk having the structure shown in FIG. 3 was thereby produced.

Bit Contrast

The recording layers of this sample were initialized (crystallized) with a bulk eraser, and the sample was recorded by irradiating the sample with a recording data beam having a wavelength of 660 nm and a pulse width of 50 ns through the substrate 2 with the sample in stationary state, and the bit contrast of each layer was measure by irradiating the reading data beam having the same wavelength. An optical pickup having a confocal optical system was used for the irradiation of the data beam and the detection of the reflected light. The objective lens of the optical pickup had a numerical aperture of 0.52. The results of the measurement reveal that the bit contrast produced was sufficient in all of the four data layers. It was also revealed that the difference in the recording sensitivity between the data layers was small.

C/N (Carrier to Noise Ratio)

The sample was rotated, and single signal comprising pulses of the same length continuing at a constant interval was recorded in the data layers of the sample, and the recorded signal was read to measure the C/N. The recorded pulses were at a duty ratio of 50%. A data beam having a wavelength of 660 nm was used for the recording and the reading. In the recording and the reading, tracking servo was also conducted by reading the servo layer SL with a servo beam having a wavelength of 780 nm. The results of the measurement indicate that the C/N was sufficiently high.

Bit Error Rate

The sample was recorded with a random signal of 1–7 modulation (mark length, 2T to 8T), and the signal was read to measure the bit error rate (BER). The results of the measurement indicate that the bit error rate was sufficiently low.

Comparative Example 1

The transparent layers TL-1 to TL-4 were formed by repeating the procedure of Example 1 except that no plug means was used and the spin coating was conducted by supplying the UV-curable resin at a location 18 mm from the center of the substrate and rotating at 2500 rpm for 4 seconds. The transparent layers were evaluated for their thickness as in the case of Example 1. The average thickness was 14.7 μm, and the thickness inconsistency was within 8.2 μm, the inconsistency being significantly higher than that of Example 1.

Example 2

The transparent layers TL-1 to TL-4 were formed by repeating the procedure of Example 1 except that the spin coating was conducted at a rotation speed of 2500 rpm for a rotation time of 3 seconds. The average thickness of the transparent layers was measured to be 20 μm and the thickness inconsistency was within 2 μm.

Example 3

The transparent layers TL-1 to TL-4 were formed by repeating the procedure of Example 1 except that the UV-curable resin used was SSP50U10 manufactured by Showa High Polymer K. K. and the spin coating conditions were changed to the rotation speed of 6000 rpm and the rotation time of 4 seconds. The average thickness of the transparent layers was measured to be 28 μm and the thickness inconsistency was within 2 μm.

Merits of the Invention

In the production of a multi-layer recording medium having a plurality of information-storing layers according to the present invention, a plug member is used in the formation of the resin layers to avoid overlaying of the annular raised rim formed in the inner periphery of the resin layer by another resin layer. This has enabled production of an optical disk exhibiting excellent mechanical precision, reduced fluctuation in the output, and sufficient stability in the reading.

Japanese Patent Application Nos. 174543/2000 and 233783/2000 are incorporated herein by reference.

Although some preferred embodiments have been described, many modifications and variations may be made thereto in the light of the above teachings. It is therefore to be understood that within the scope of the appended claims, the invention may be practiced otherwise than as specifically described.

What is claimed is:

1. An optical information medium having at least two annular information-storing layers each storing recorded information and/or servo information on a disk-shaped substrate formed with a center hole or between a pair of disk-shaped substrates each formed with a center hole, wherein at least one of the information-storing layers is recorded or read by the recording beam or the reading beam which has passed through other information-storing layer(s), wherein the medium has at least two annular resin layers each having an annular raised rim at its inner periphery, and the annular resin layers are formed such that their inner peripheries are in the form of steps and the annular raised rim of the resin layer is prevented from being covered by the overlying resin layer.

2. An optical information medium according to claim 1 wherein the resin layer is disposed between adjacent information-storing layers each storing the recorded information, and the resin layer has a thickness of 5 μm to less than 30 μm.

3. An optical information medium according to claim 1 wherein said information-storing layer is read by using a confocal optical system.

4. An optical information medium according to claim 1 wherein the information-storing layer comprises a data layer storing the recorded information and a servo layer storing servo information which are independently formed from each other.

5. A method for producing the optical information medium according to claim 1 wherein the method comprises the consecutive steps of:

placing the substrate on a turntable and covering the center hole of the substrate by a plug means having a disk member, supplying a coating solution containing the resin onto the disk member, and rotating the substrate with its center hole covered by the plug means to thereby spread the coating solution over the substrate and form the resin layer;

removing the disk member from the substrate to leave the annular resin layer having an annular raised rim formed at its inner periphery; and curing the resin layer.

6. A method for producing an optical information medium having at least two annular information-storing layers formed on a substrate, comprising:

placing the substrate on a turntable and covering a center hole of the substrate by a plug having a disk member;

supplying a coating solution including a resin onto the substrate;

rotating the substrate with its center hole covered by the plug to spread the coating solution over the substrate and form a first annular resin layer;

removing the disk member from the substrate to leave the first annular resin layer having an annular raised rim formed at an inner periphery of the first annular resin layer;

curing the first annular resin layer; and repeating the supplying, rotating, removing, and curing for forming a second annular resin layer over the first annular resin layer such that the raised rims at the inner peripheries of the first and second annular resin layers are in a form of steps.

* * * * *

UNITED STATES PATENT AND TRADEMARK OFFICE
CERTIFICATE OF CORRECTION

PATENT NO. : 6,576,319 B2
DATED : June 10, 2003
INVENTOR(S) : Yoshinari et al.

It is certified that error appears in the above-identified patent and that said Letters Patent is hereby corrected as shown below:

<u>Title page</u>,
Item [75], Inventor, should read:
-- [75] Inventors: Jiro Yoshinari, Tokyo (JP); Takuya Tsukagoshi, Tokyo (JP); Tsuyoshi Komaki, Tokyo (JP) --

Signed and Sealed this

Eighteenth Day of November, 2003

JAMES E. ROGAN
*Director of the United States Patent and Trademark Office*